US005397203A

United States Patent [19]

Kleine et al.

[11] Patent Number: 5,397,203

[45] Date of Patent: Mar. 14, 1995

[54] TOOL AND TOOL HOLDER FOR HAND-TOOL APPARATUS

[75] Inventors: Werner Kleine, Achim-Uesen; Wolfgang Lange, Oyten; Reinhard Schulz, Munich; Holger Meinke, Achim-Uphusen, all of Germany

[73] Assignee: Hilti Aktiengesellschaft, Furstentum, Liechtenstein

[21] Appl. No.: 90,356

[22] Filed: Jul. 12, 1993

[30] Foreign Application Priority Data

Jul. 15, 1992 [DE] Germany ........................ 42 23 219.8
Dec. 16, 1992 [DE] Germany ........................ 42 42 452.6

[51] Int. Cl.[6] ........................ B23B 51/00; B23B 31/22

[52] U.S. Cl. .................................. 408/226; 279/19.3; 279/19.5; 279/75

[58] Field of Search ........................ 279/19, 19.3–19.5, 279/75, 905; 408/226

[56] References Cited

U.S. PATENT DOCUMENTS

| | | | |
|---|---|---|---|
| 4,131,165 | 12/1978 | Wanner et al. | 279/19.3 X |
| 4,512,692 | 4/1985 | Nielsen | 408/226 |
| 4,702,651 | 10/1987 | Kleine | 408/226 |
| 5,028,057 | 7/1991 | Wanner | 408/226 X |
| 5,076,371 | 12/1991 | Obermeier et al. | 408/226 X |
| 5,174,698 | 12/1992 | Obermeier | 408/226 X |

FOREIGN PATENT DOCUMENTS

| | | | |
|---|---|---|---|
| 0355071 | 2/1990 | European Pat. Off. | |
| 2551125 | 4/1987 | Germany | |
| 4032739 | 4/1992 | Germany | 408/226 |

*Primary Examiner*—Steven C. Bishop
*Attorney, Agent, or Firm*—Anderson Kill Olick & Oshinsky

[57] ABSTRACT

The tool for a tool holder of hand tools used for chiseling and/or percussion drilling has a chucking shank (9). This chucking shank (9) is provided with two rotary driving grooves (10) which are located diametrically opposite one another and open axially toward the free end of the chucking shank (9). Also, the chucking shank (9) has two diametrically opposite, axially closed locking grooves (11). In order to increase the total working surface decisive for the transmission of torque, two longitudinal grooves (12) are provided which are likewise arranged diametrically opposite one another and open axially toward the free end of the chucking shank (9). The length of these longitudinal grooves (12) exceeds the length of the locking grooves (11). The axes of symmetry (L) of the longitudinal grooves (12) are arranged at an acute angle (a) to the axes of symmetry (V) of the locking grooves (11). In addition, the flanks **(12*a*) of the longitudinal grooves on the driving side extend in a straight line and tangentially relative to the base of the locking grooves (11)** so as to form optimal working surfaces for the transmission of torque.

20 Claims, 5 Drawing Sheets

TOOL AND TOOL HOLDER FOR HAND-TOOL APPARATUS

The invention relates to a tool for insertion in a tool holder for hand-tool apparatus used for chiseling and/or percussion drilling with a chucking shank having at least one axially closed locking groove and at least two rotary driving grooves which open axially toward the free end of the chucking shank.

Tools for hand-tool apparatus are known from DE-PS 25 51 125. The chucking shank of these tools has one or two axially closed locking grooves and one or two rotary driving grooves which open axially toward the free end of the chucking shank. The tool holder serving to receive these tools has one or two radially displaceable locking members which are constructed in the present case as balls. It is also known to construct the locking members in the form of cylinders rather than as balls. A positive engagement between the tool and the tool holder is brought about by the cooperation of these locking members with the axially closed locking grooves. This positive engagement is canceled when the locking members move out radially so that the tools can be removed from the tool holder.

The above-mentioned locking grooves along with the locking members cooperating with them are not exposed to particularly high stresses, since the tool located in the tool holder is supported during operation in a practically floating manner relative to the locking members, i.e. the locking members in cooperation with the locking grooves need not transmit any considerable forces during operation. Only when extracting the tool from a bore hole in structural members is it necessary for certain axial forces to be transmitted via the locking grooves cooperating with the locking members so as to ensure that the connection between the tool and tool holder is maintained.

On the other hand, the rotary driving grooves which open toward the free end of the chucking shank and in which corresponding drive gibs of the tool holder engage are subjected to extremely high stresses. These high stresses are caused by the torque transmitted from the tool holder to the tool. The greater the diameter of the working area in the tools being employed, the higher is the torque. As a result of current trends, whereby tools having a greater diameter in the working area are used in the hand-tool apparatus to an increasing extent, the extremely high torque which must be transmitted leads to such extensive wear at the rotary driving grooves that the tools become defective prematurely. This premature failure in relation to the rotary driving grooves can occur considerably sooner than the normal wear of the working area of the tools associated purely with use.

The use of larger rotary driving grooves to achieve a larger working surface decisive for the transmission of torque is undermined due to the fact that this leads to an excessive weakening of the cross section of the chucking shank. Such weakening of the cross section assures premature failure. The arrangement of additional rotary driving grooves is ineffectual for reasons of space, since a portion of the surface of the chucking shank is already occupied by the axially closed locking grooves and the arrangement of additional means at the surface would drastically impair the guidance of the tool. For example, a tool known from EP-A 0 355 071 shows a chucking shank whose surface is occupied by three axially closed locking grooves. Consequently, in this known solution there remains room for only one rotary driving groove corresponding to conventional dimensional proportions and for an additional rotary driving groove of substantially smaller dimensions which is axially adjacent to a locking groove at both sides. Accordingly, there is a very substantial sacrifice in this known solution with respect to the maximum torque to be transmitted and with respect to the quality of guidance because of the locking grooves which occupy a considerable portion of the surface of the chucking shank.

The object of the present invention is to provide a tool which, particularly in combination with a suitable tool holder, ensures that greater torque can be transmitted without susceptibility to wear.

This object is met according to the invention by providing at least one longitudinal groove which is open axially toward the free end of the chucking shank and is arranged in such a way that, on the one hand, there are unequal distances in the circumferential direction relative to the rotary driving grooves adjoining at both sides and, on the other hand, the axial projection of the longitudinal groove overlaps with the axial projection of the locking groove while forming a shoulder surface remote of the rear end.

Corresponding to the embodiment form of the tool according to the invention there is at least one longitudinal groove opening toward the free end of the chucking shank also available for transmission of torque in addition to the rotary driving grooves opening axially toward the free end of the chucking shank. The longitudinal groove is arranged in such a way that it neither adds to a weakening of the chucking shank of the tool nor critically reduces the surface of the chucking shank used for guidance. Consequently there is also no sacrifice in the guidance quality of the tool according to the invention, although the total working surface decisive for the transmission of torque is increased to a very considerable extent.

As a result of the inventive overlapping of the axial projections of the locking groove and longitudinal groove a shoulder surface is formed remote of the rear end which secures axially in cooperation with corresponding locking members of the tool holder. Since there are no substantial forces to be transmitted in the axial direction, this shoulder surface is entirely sufficient for the purpose assigned to it.

Preferably, two longitudinal grooves are provided, whose respective axial projections overlap with the axial projection, respectively, of two locking grooves accompanied by the formation of shoulder surfaces remote of the rear end. The total working surface decisive for the transmission of torque is accordingly additionally increased without additional weakening of the cross section of the chucking shank and without sacrificing the critical portions of the surface of the chucking shank serving to guide the tool.

The two longitudinal grooves together with the locking grooves whose axial projection overlaps the axial projection of the longitudinal grooves are advisably arranged so as to be substantially diametrically opposed. This brings about a uniform distribution of forces as well as advantages relating to manufacturing technology such that when manufactured without cutting, e.g. by extrusion, the extrusion devices can be arranged opposite one another.

In relation to torsional stress it is advantageous that the axes of symmetry of the longitudinal grooves lie at an acute angle to the axes of symmetry of the locking grooves. Apart from these advantages, such an offset arrangement also makes optimal use of the nonoverlapping portions of axial projection surfaces as shoulder surfaces for axially securing the tool. This angle can range substantially between approximately 10° and 35°.

A sufficient increase in the total working surface governing the transmission of torque is achieved above all when the length of the longitudinal grooves exceeds the axial length of the locking grooves on both sides. This longitudinal dimensioning of the longitudinal grooves does not result in a weakening of the cross section of the chucking shank and moreover additionally contributes to an optimal guiding behavior.

A weakening of the cross section of the chucking shank is also prevented in particular when the axial projection of the longitudinal grooves is smaller than the axial projection of the locking grooves. Such a dimensioning has a positive effect in turn on the formation of the shoulder surface which is decisive for the axial support of the tool.

It is also advisable, particularly in connection with preventing a weakening of the cross section of the chucking shank, that the entire axial projection of the longitudinal grooves be arranged within the axial projection of the locking grooves.

Advantageously, the respective opening edges of the longitudinal grooves and locking grooves on the driving side coincide so that no deformation discontinuities occur which could result in damage to the tool. In addition, a construction of this kind facilitates the manufacturing process insofar it enables a simplification of the devices required for this purpose.

Optimal ratios are achieved in relation to the transmission of torque when at least the flank of the longitudinal grooves on the driving side advantageously extends substantially radially at least in part. The cross section of the longitudinal groove can be constructed optionally, e.g. in the form of a trapezoid or a triangle. Since the longitudinal grooves penetrate the locking grooves it is inevitable that the locking members also come into contact with the longitudinal grooves. In order to prevent the formation of edges at the transitions between the longitudinal grooves and locking grooves which could lead to wear of the locking members, at least the flank of the longitudinal grooves on the driving side preferably extends in a straight line and forms a tangent to the base of the locking grooves, the base of the locking grooves being rounded.

According to another embodiment form of the invention, the flank of the longitudinal grooves on the driving side can extend in a convex curve and the base of the locking grooves can be rounded. The curves of the longitudinal grooves and locking grooves abut in the overlapping area. Such a construction of the longitudinal groove also prevents deformation discontinuities which may damage the tool.

With respect to avoiding deformation discontinuities, an optimal design of the longitudinal grooves is obtained when their flank on the driving side preferably curves in a concave manner and the base of the locking grooves is rounded. The curves of the longitudinal grooves and locking grooves also coincide in this case. In addition to its advantages with respect to manufacture and reduced wear, this construction of the longitudinal grooves also results in a visually flawless chucking shank.

As is known per se, the tools according to the invention can be manufactured with or without cutting, e.g. by means of extrusion. Practically any desired profile of the chucking shank, and accordingly of the longitudinal grooves, can be produced by machining. For non-cutting manufacture, e.g. by extrusion, the flank of the longitudinal grooves located opposite the flank on the driving side preferably extends in a straight line and forms a positive angle of opening with the axis of symmetry of the locking grooves. Accordingly, no undercuts are formed which could impede the feed to the extrusion devices.

Particularly in relation to the dimensioning of the longitudinal gibs cooperating with the longitudinal grooves on the tool holder side, it is advantageous when the flank of the longitudinal grooves located opposite the flank on the driving side is curved in a concave manner. In so doing, this flank can be constructed so as to be symmetric with the flank on the driving side.

Again in relation to an optimal design of the longitudinal gibs cooperating with the longitudinal grooves on the tool holder side, it is advisable particularly as regards strength that the flank of the longitudinal grooves lying opposite to the flank on the driving side be constructed so as to curve in a concave manner. The longitudinal grooves as well as the longitudinal gibs cooperating with the latter on the tool holder side can accordingly be constructed in a symmetrical profile when both flanks are constructed in the same way so as to curve in a concave manner.

The advantage of the tool constructed in the manner discussed above consists in that it can be used in a conventional tool holder, e.g. corresponding to DE-PS 25 51 125. However, higher proportions of torque can not be transmitted since the longitudinal grooves remain without function. On the other hand, the advantages according to the invention, i.e. the possibility of increasing the transmitted torque, can be fully exploited when the tool is inserted in a tool holder with a receptacle opening which advisably has at least one radially displaceable locking member cooperating with the axially closed locking grooves, is provided with at least two locking gibs cooperating with the rotary driving grooves which open axially toward the free end of the chucking shank, and with at least one longitudinal gib cooperating with the longitudinal groove which opens axially toward the free end of the chucking shank. The axial projection of the longitudinal gib overlaps the axial projection of the area of the respective locking member projecting into the receptacle opening and is at unequal distances in the circumferential direction relative to the adjacent drive gibs on both sides.

The tool holder preferably has two diametrically opposite drive gibs so that there is a uniform distribution of the torque to be transmitted to the tool.

Two diametrically opposite longitudinal gibs are also provided for uniform distribution of the torque to be transmitted. These longitudinal gibs are advisably offset relative to the locking members in such a way that the axis of symmetry of the longitudinal gibs is at an acute angle to the axes of symmetry of the locking members.

A preferred embodiment form of the longitudinal gibs consists in that at least their flank on the driving side curves in a convex manner. A symmetric profile of the longitudinal gibs brings about certain advantages, particularly in relation to manufacture, so that another preferred embodiment form is characterized in that the flank lying opposite the flank on the driving side is also curved in a convex manner. The curve of the flank on the driving side and of the flank opposite the latter can correspond substantially to the curve circumscribing the locking members which are preferably constructed as balls or cylinders.

The invention is explained in more detail in the following with reference to drawings showing examples of the invention.

Figure 11:
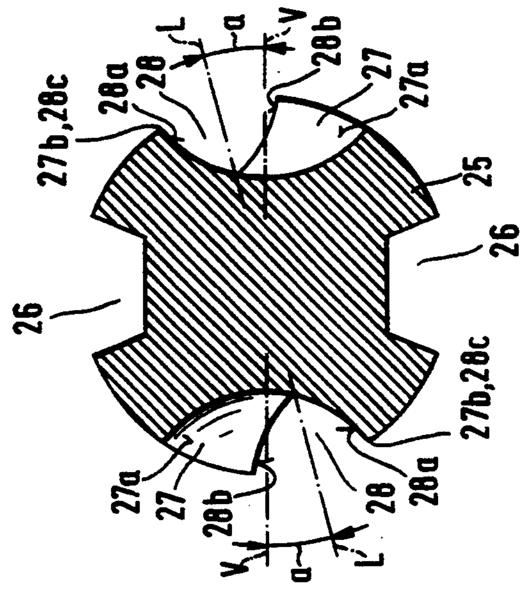
Figure 10:
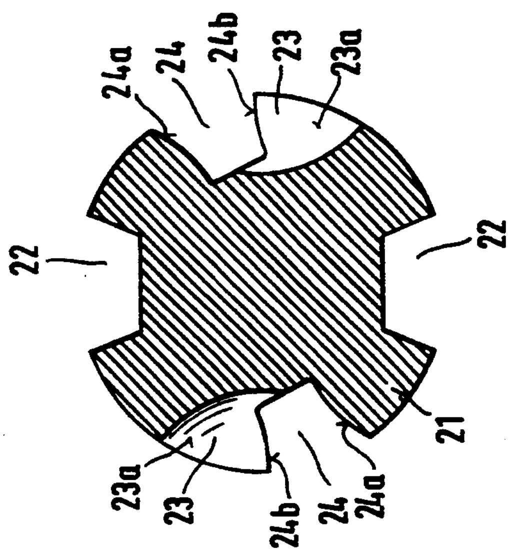
Figure 9:
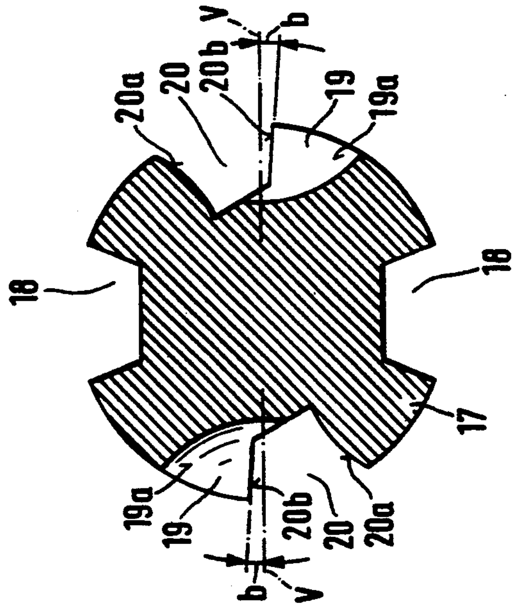

FIGS. 9, 10, and 11 show additional embodiment forms of chucking shanks in section corresponding to the preceding figure.

Figure 1:
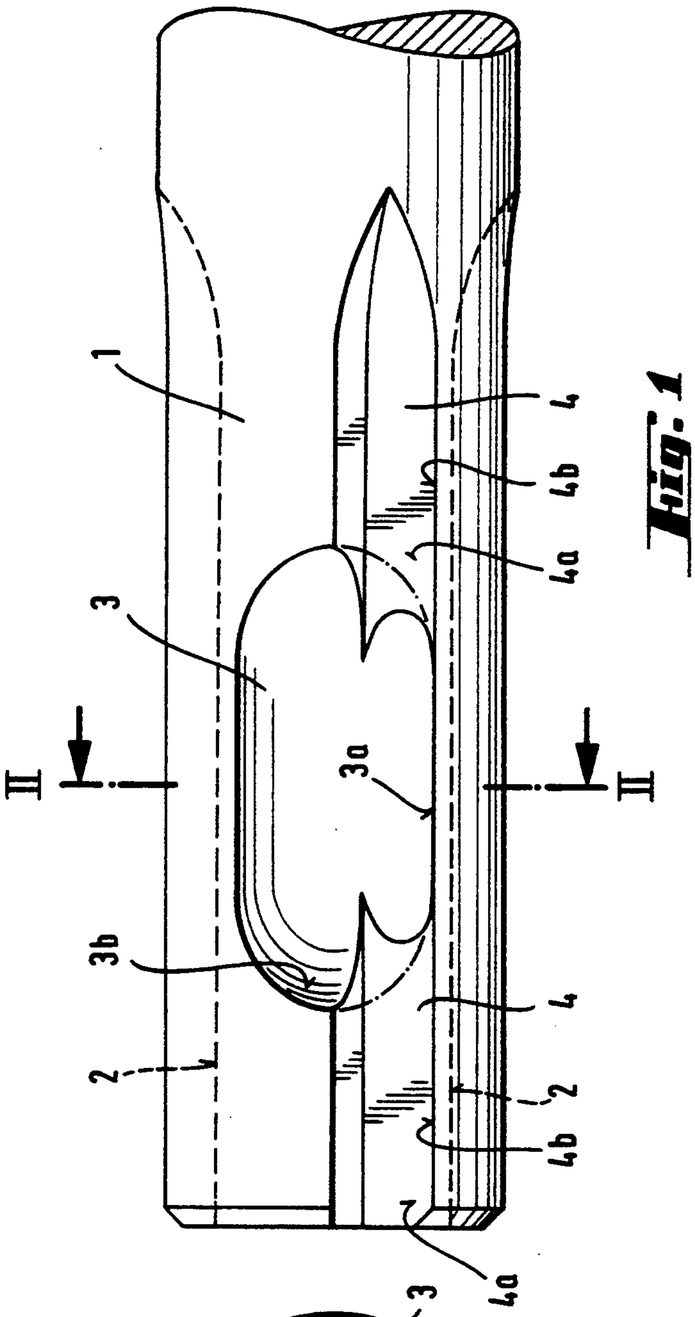
FIG. 1 shows a view of the chucking shank of a tool according to the invention.
Figure 2:
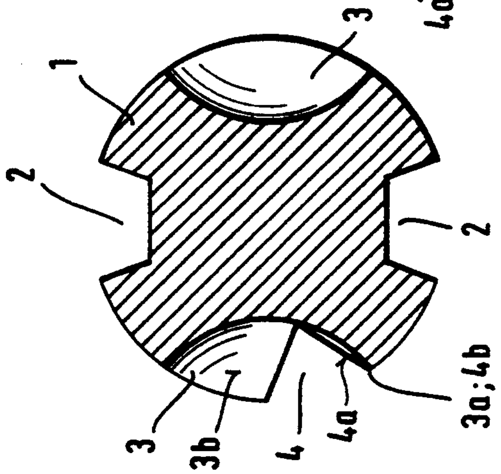
FIG. 2 shows a section through the chucking shank of FIG. 1 along line II—II.

The tool according to FIGS. 1 and 2 has a chucking shank 1. The chucking shank 1 is provided with two rotary driving grooves 2 which are located diametrically opposite one another and open axially toward the free end of the chucking shank 1. In addition, the chucking shank I is provided with two axially closed locking grooves 3 which are arranged diametrically opposite one another. Further, a longitudinal groove 4 is provided whose length exceeds that of a locking groove 3 at both sides and the axial projection of the longitudinal groove 4 lies within the axial projection of one locking groove 3. The area of the locking groove 3 not overlapped by the axial projection of the longitudinal groove 4 forms a shoulder surface 3*b*.

As shown in particular in FIG. 2, the cross section of the longitudinal groove 4 is substantially V-shaped. The flank 4*a* of the longitudinal groove 4 on the driving side extends substantially radially and tangentially relative to the base of the locking groove 3. In addition, FIG. 2 shows how the opening edge 3*a* of the locking groove 3 coincides with the opening edge 4*b* of the longitudinal groove 4.

Figure 3:
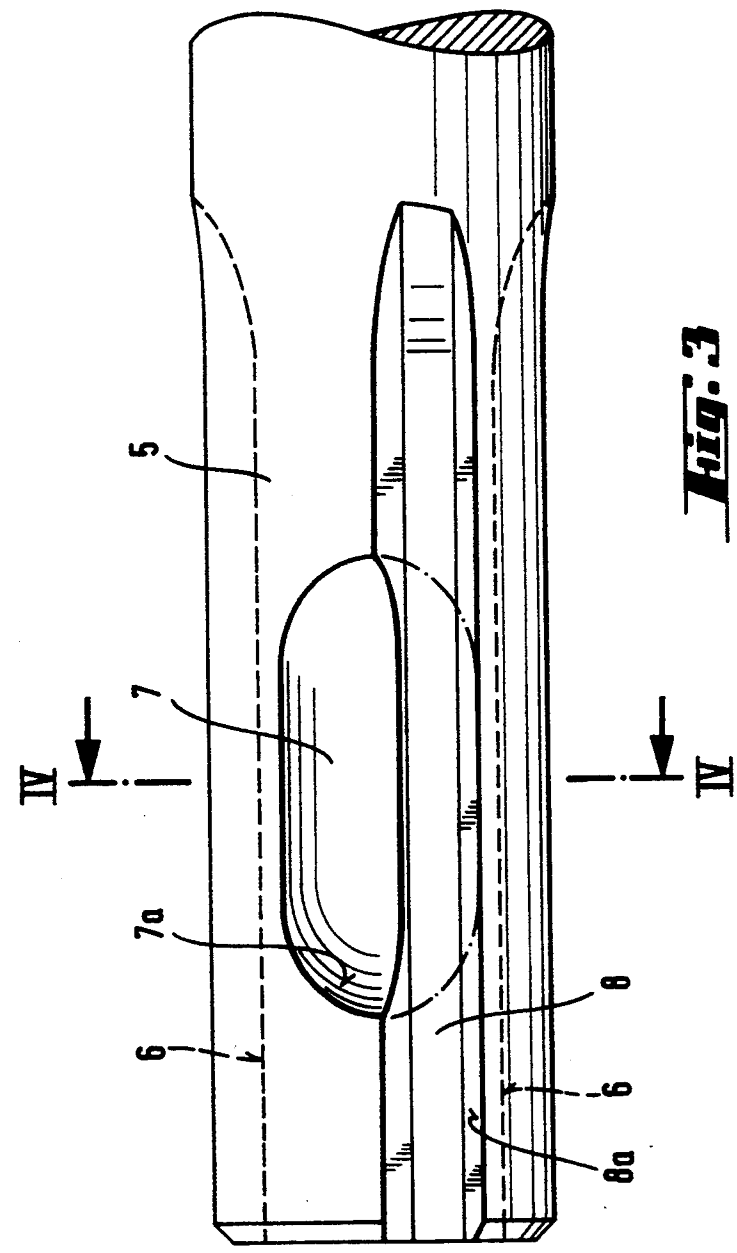
FIG. 3 shows a view of the chucking shank of another tool according to the invention.
Figure 4:
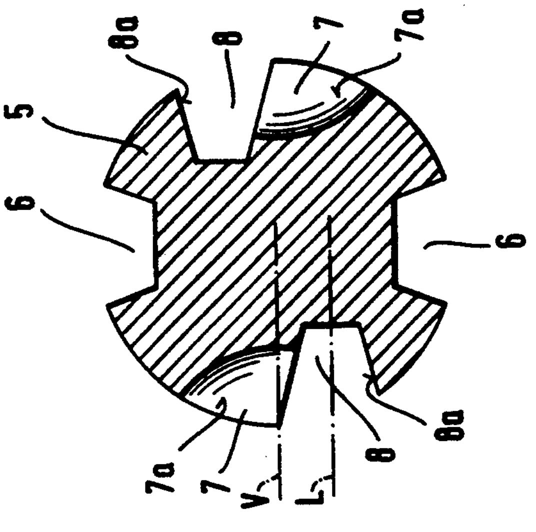
FIG. 4 shows a section through the chucking shank of FIG. 3 along line IV—IV.

The tool according to FIGS. 3 and 4 has a chucking shank 5 with two diametrically opposite rotary driving grooves 6 opening axially toward the free end. Two locking grooves 7 are provided which are likewise located diametrically opposite one another. These locking grooves 7 are penetrated along their length by longitudinal grooves 8 which are also arranged diametrically opposite one another and have flanks 8*a* on the driving side. The longitudinal grooves 8 are arranged relative to the locking grooves 7 in such a way that the axial projections of the longitudinal grooves 8 overlap with the axial projections of the locking grooves 7. Shoulder surfaces 7*a* are formed by the regions which do not overlap. As shown particularly in FIG. 4, the axes of symmetry L of the longitudinal grooves 8 extend parallel to the axes of symmetry V of the locking grooves 7 in this embodiment form.

Figure 5:
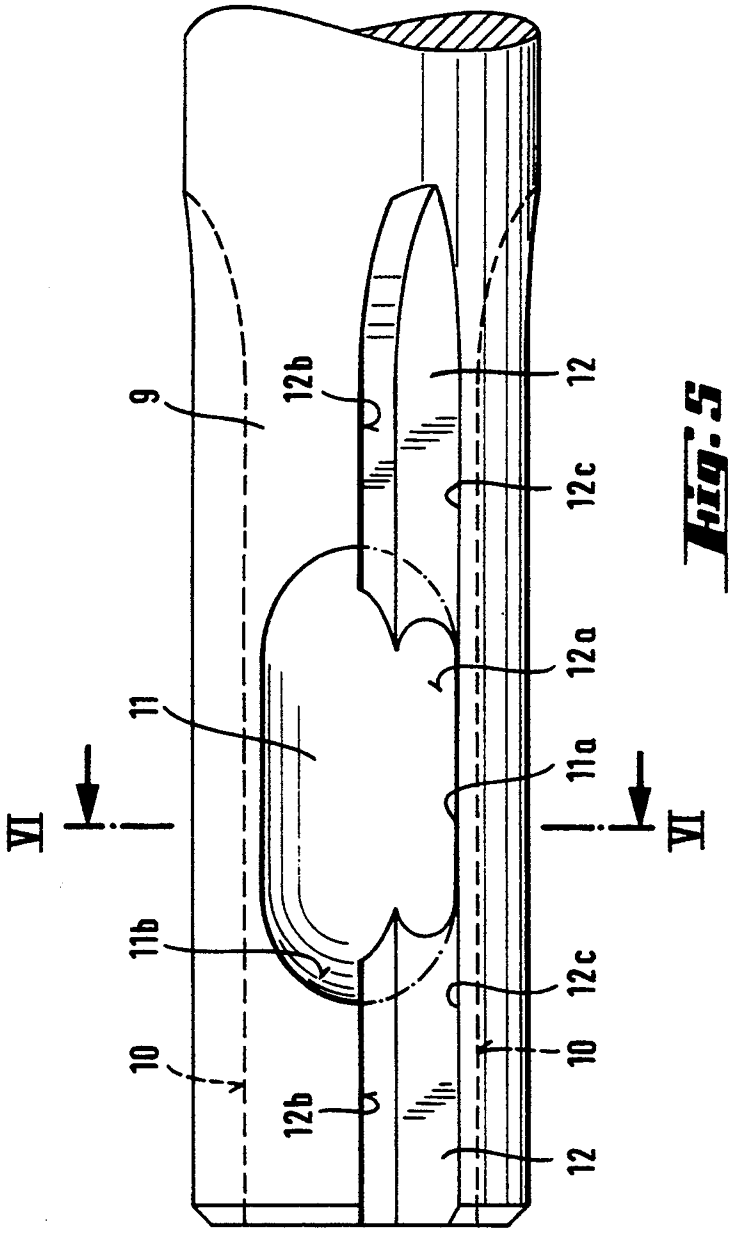
FIG. 5 shows a view of the chucking shank of another tool according to the invention.
Figure 6:
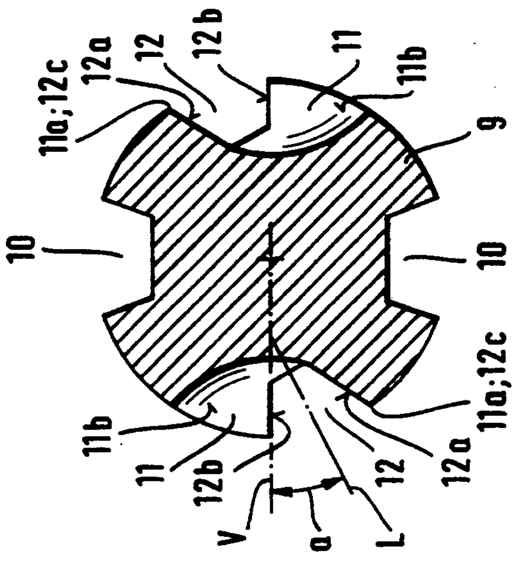
FIG. 6 shows a section through the chucking shank of FIG. 5 along line VI—VI.

The tool according to FIGS. 5 and 6 has a chucking shank 9 which is provided with two diametrically opposite rotary driving grooves 10 opening axially toward the free end of the chucking shank 9. Further, two diametrically opposite locking grooves 11 are provided, whose length is exceeded on both sides by two diametrically opposite longitudinal grooves 12. As shown particularly in FIG. 6, the longitudinal grooves 12 have a substantially trapezoidal profile and the axes of symmetry L of the longitudinal grooves 12 lie at an acute angle a to the axes of symmetry V of the locking grooves 11. The flanks of the longitudinal grooves 12 are selected in such a way that the flanks 12*a* on the driving side substantially form a tangent to the base of the locking grooves 11 and the flanks 12*b* located opposite the flanks 12*a* on the driving side extend parallel to the axis of symmetry V of the locking grooves 11. The angle of opening of these flanks 12*b* relative to the axis of symmetry V of the locking grooves 11 is accordingly 0° i.e. it is at the lowest limiting value of its positive opening.

As is further shown in FIG. 6, the opening edges 12*c* of the longitudinal grooves 12 coincide with the opening edges 11*a* of the locking grooves 11. Moreover, FIG. 6 clearly shows that the axial projection of the longitudinal grooves 12 lies within the axial projection of the locking grooves 11 so that the areas of the locking grooves 11 which are not overlapped form shoulder surfaces 11*b*.

Figure 7:
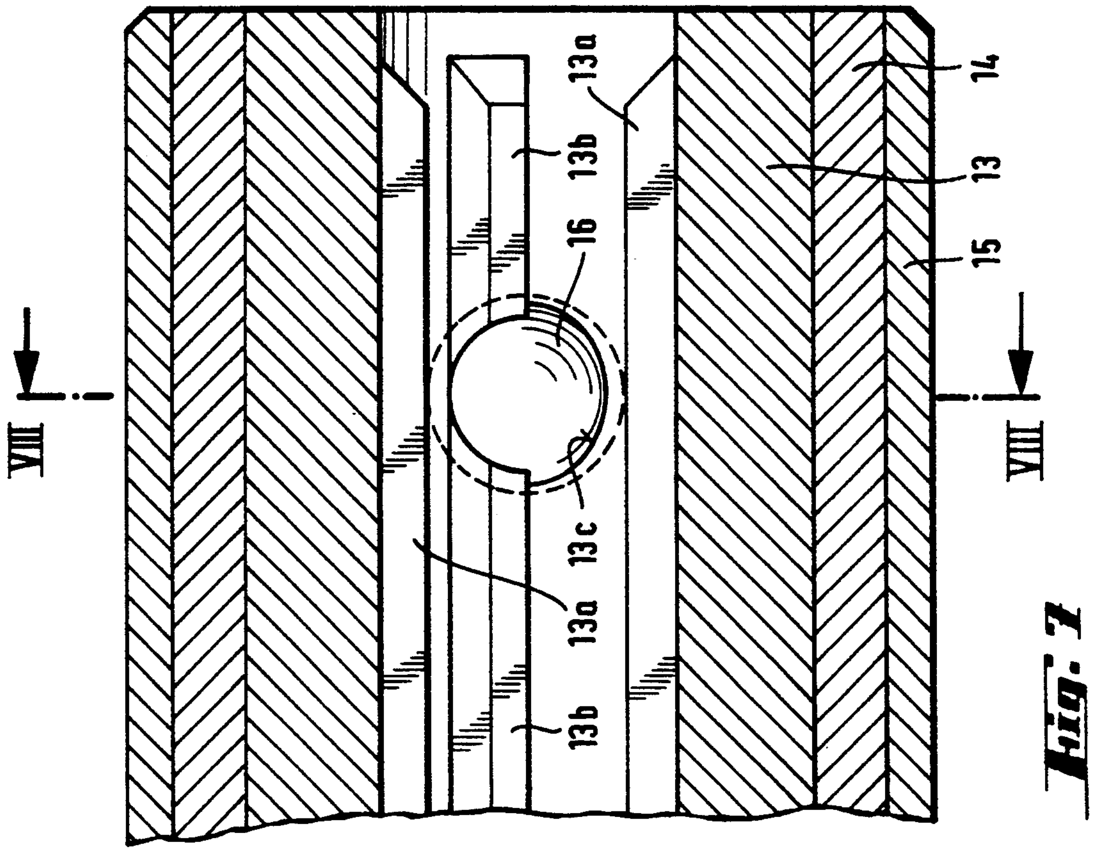
FIG. 7 shows a schematic view of a tool holder according to the invention in longitudinal section.
Figure 8:
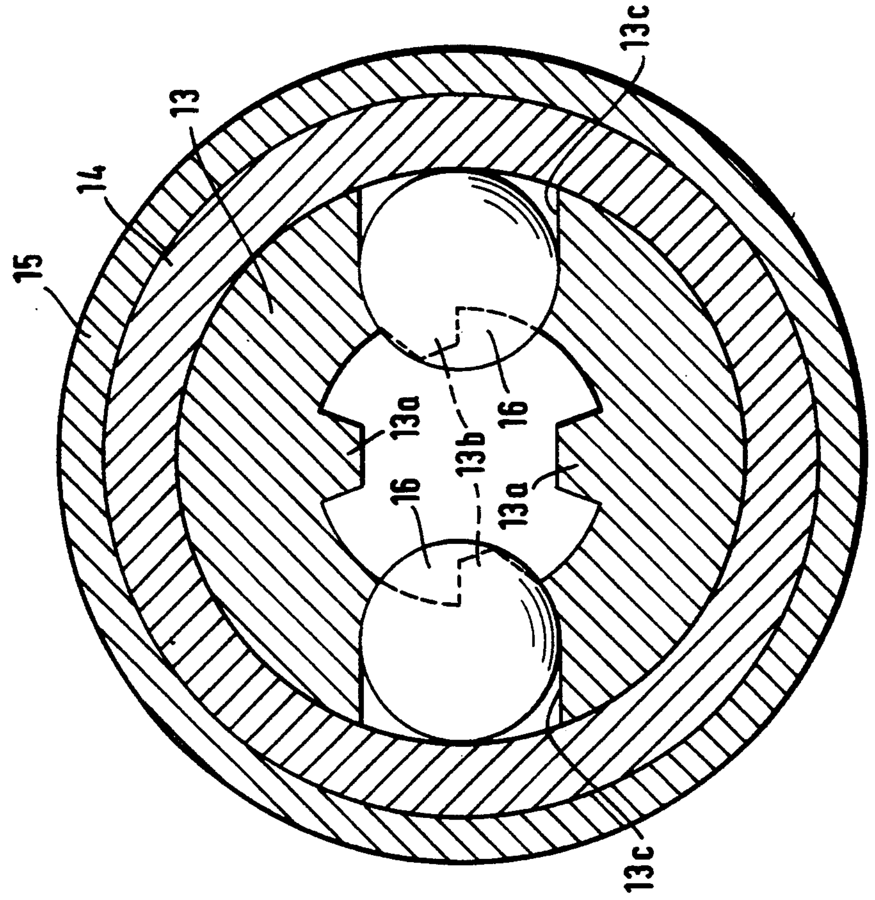
FIG. 8 shows a section through the tool holder of FIG. 7 along line VIII—VIII.

FIGS. 7 and 8 show a simplified view of a part of a tool holder e.g. for receiving tools corresponding to FIGS. 5 and 6. The tool holder includes a guide 13, an actuating sleeve 14 and a retainer or cage 15. The guide 13 has two diametrically opposite drive gibs 13*a* as well as two longitudinal gibs 13*b* which are likewise located diametrically opposite one another. Corresponding to the tool in FIGS. 5 and 6, the drive gibs 13*a* cooperate with the rotary driving grooves 10 and the longitudinal gibs 13*b* cooperate with the longitudinal grooves 12. Looking members 16 constructed in the form of balls are provided for cooperating with the locking grooves 11, e.g. in a tool corresponding to FIGS. 5 and 6, two of these locking grooves 11 lying diametrically opposite one another. These locking members 16 are supported so as to be radially displaceable, passages 13*c* being provided inside the guide 13 for this purpose. As a result of the rotation or longitudinal displacement of the actuating sleeve 14 relative to the guide 13, the locking members 16 can move out into recesses, known per se and not shown in the drawing, so that they exit from the clearance opening of the guide 13 and accordingly release the chucking shank 9 for removal of the tool by disengaging from the locking grooves 11 of the tool according to the FIGS. 5 and 6.

FIGS. 9 to 11 show additional embodiment forms of tools with a chucking shank 17, 21, 25, respectively, which is provided with diametrically opposite rotary driving grooves 18, 22, 26 and with locking grooves 19, 23, 27 which are also located diametrically opposite one another.

The chucking shank 17 according to FIG. 9 is provided with longitudinal grooves 20 whose flank 20*a* on the driving side is curved in a convex manner. As is further shown in FIG. 9, the base of the locking grooves 19 is rounded and the longitudinal grooves 20 and locking grooves 19 are adapted to one another in such a way that the curves abut.

FIG. 9 also shows that shoulder surfaces 19*a* are formed by the areas which do not overlap. It also shows that the flank of the longitudinal grooves 20 located opposite the flank 20*a* on the driving side extends in a straight liner specifically at a positive angle of opening b relative to the axis of symmetry V of the locking grooves 19. This angle of opening b can range between 2° and 10°.

The chucking shank 21 according to FIG. 10 has longitudinal grooves 24 whose flank 24a on the driving side is curved in a convex manner similar to the construction corresponding to FIG. 9. Also, the flank 24*b* of the longitudinal grooves 24 located opposite the flank 24*a* on the driving side is likewise curved in a convex manner similar to the flank 24*a* on the driving side. Shoulder surfaces 23*a* are again formed in the nonoverlapping region of the locking grooves 23 and longitudinal grooves 24.

The chucking shank 25 according to FIG. 11 is provided with longitudinal grooves 28 in which the flank 28*a* on the driving side and the flank 28b located opposite this flank 28*a* are curved in a concave manner. Symmetric longitudinal grooves 28 are accordingly formed, whose axis of symmetry L is at an acute angle a to the axis of symmetry V of the locking grooves As shown particularly in FIG. 11, the flank 28*a* on the driving side is curved in the same manner as the base of the locking grooves 27. The opening edges 27*b* of the locking grooves 27 accordingly coincide with the opening edges 28*c* of the longitudinal grooves 28. FIG. 11 also shows that stop faces 27*a* are formed in the region of the longitudinal grooves 28 and rotary driving grooves 27 which is not overlapped.

We claim:

1. Tool for insertion in a tool holder for a hand-tool apparatus used for chiseling, percussion drilling or both, with a chucking shank having at least one axially closed locking groove and at least two rotary driving grooves, which open axially toward a free end of the chucking shank, comprising at least one longitudinal groove which opens axially toward the free end of the chucking shank and is arranged in such a way that, on the one hand, there are unequal distances in the circumferential direction relative to the rotary driving grooves adjacent to the grooves following in both circumferential directions; and, on the other hand, an axial projection of the longitudinal groove overlaps with an axial projection of the axially closed locking groove, while the locking groove forms a shoulder surface remote of the free end.

2. Tool according to claim 1, comprising that two longitudinal grooves are provided whose respective axial projections overlap with the axial projections, respectively, of two locking grooves accompanied by the formation of shoulder surfaces of the locking grooves remote of the free end.

3. Tool according to claim 2, comprising that the two longitudinal grooves, along with the locking grooves whose axial projections overlap that of the two longitudinal grooves, are arranged so as to lie substantially diametrically opposite one another.

4. Tool according to claim 1 or 2, comprising that axes of symmetry of the longitudinal grooves lie at an acute angle to axes of symmetry of the locking grooves.

5. Tool according to one of claims 1 to 3, comprising that an axial length of the longitudinal grooves exceeds an axial length of the locking grooves at both axially extending sides.

6. Tool according to one of claims 1 to 3, comprising that the axial projection of the longitudinal grooves is smaller than the axial projection of the locking grooves.

7. Tool according to one of claims 1 to 3, comprising that the entire axial projection of the longitudinal grooves lies within the axial projection of the locking grooves.

8. Tool according to one of claims 1 to 3, comprising that respective opening edges of the longitudinal grooves and locking grooves on a driving side coincide.

9. Tool according to one of claims 1 to 3, comprising that the longitudinal grooves have a flank on a driving side which extends substantially radially at least in part.

10. Tool according to one of claims 1 to 3, comprising that at least a flank on a driving side of the longitudinal grooves extends in a straight line and a base of the locking grooves is rounded, the flank of the longitudinal grooves on the driving side forming a tangent to the base of the locking grooves.

11. Tool according to one of claims 1 to 3, comprising that at least a flank of the longitudinal grooves on a driving side thereof is curved in a convex manner, a base of the locking grooves is rounded, and curves of the longitudinal grooves and locking grooves abut.

12. Tool according to one of claims 1 to 3, comprising that at least a flank on a driving side of the longitudinal grooves is curved in a concave manner, a base of the locking grooves is rounded, and curves of the longitudinal grooves and locking grooves coincide.

13. Tool according to one of claims 1 to 3, comprising that a flank located opposite a flank of the longitudinal grooves on a driving side extends in a straight line and forms a positive angle of opening with an axis of symmetry of the locking grooves.

14. Tool according to one of claims 1 to 3, comprising that a flank of the longitudinal grooves located opposite a flank on a driving side is curved in a convex manner.

15. Tool according to one of claims 1 to 3, comprising that a flank of the longitudinal grooves located opposite a flank on a driving side is curved in a concave manner.

16. A tool holder with a receptacle opening for a tool used for chiseling, percussion drilling or both, comprising at least one radially displaceable locking member cooperating with axially closed locking grooves, at least two drive gibs cooperating with rotary driving grooves which open axially toward a chucking shank, and at least one longitudinal gib cooperating with longitudinal groove which opens axially toward a free end of the chucking shank, an axial projection of the longitudinal gib overlaps the axial projection of the area of the respective locking member projecting into the receptacle opening and has unequal distances in the circumferential direction relative to the adjacent drive gibs on both sides.

17. Tool holder according to claim 16, further comprising two said drive gibs located diametrically opposite one another.

18. Tool holder according to claim 17, comprising two longitudinal gibs located diametrically opposite one another.

19. Tool holder according to claim 18, comprising that axes of symmetry of the longitudinal gibs lie at an acute angle to axes of symmetry of the locking members.

20. Tool holder according to claim 19, comprising that at least a flank of the longitudinal gibs located on a driving side is curved in a convex manner.

* * * * *